United States Patent

[11] 3,626,511

[72] Inventor: Jacob Meyer Hammer, Trenton, N.J.
[21] Appl. No.: 56,496
[22] Filed: July 20, 1970
[45] Patented: Dec. 7, 1971
[73] Assignee: RCA Corporation

[54] DIGITAL LIGHT DEFLECTOR USING ELECTRO-OPTIC GRATING
10 Claims, 4 Drawing Figs.

[52] U.S. Cl. .................................................. 350/160
[51] Int. Cl. .................................................. G02f 1/26
[50] Field of Search ...................................... 350/160, 161

[56] References Cited
UNITED STATES PATENTS
3,329,474   7/1967   Harris et al. ................... 350/160

Primary Examiner—Ronald L. Wibert
Assistant Examiner—V. P. McGraw
Attorney—H. Christoffersen ABSTRACT: A digital light deflector or modulator is disclosed in which a polarized sheet of light derived from a laser is directed through a slab of an electro-optic crystal such as lithium niobate, $LiNbO_3$. The crystal slab is thin and has a major surface provided with discrete, regularly spaced electrodes arranged in a column extending transverse to the direction of light passing through the crystal. The opposite major surface of the crystal is provided with a matching, registered column of electrodes. When an electric potential is applied across the two columns of electrodes, an electric field grating is established in the crystal which causes a diffraction of the sheet of light in a direction lying in the plane of the sheet of light. The output sheet of light from the crystal may be translated to a beam of light by lenses.

INVENTOR.
Jacob M. Hammer
BY
*Carl V. Olson*
ATTORNEY

INVENTOR.
*Jacob M. Hammer*
BY
*Carl V. Olson*
ATTORNEY

DIGITAL LIGHT DEFLECTOR USING ELECTRO-OPTIC GRATING

BACKGROUND OF THE INVENTION

There are many proposed systems, particularly in the computer and computer memory fields, which require an electrically operated light deflector capable of deflecting a laser beam in a digital manner to any one of a plurality of discrete output directions or positions. Known digital light deflectors are less than completely satisfactory for commercial use because of their complexity, cost, power consumption or slow speed of operation.

SUMMARY OF THE INVENTION

It is an object of this invention to provide an improved digital light deflector by establishing an electric field grating in a slab of an electro-optic crystal material. The field grating is created by applying an electric potential across columns of regularly spaced electrodes on opposite faces of the crystal. The amount of deflection is determined by the spacing of the electrodes. Other sets of electrodes having different spacings operate, when energized, to provide different respective amounts of deflection.

DESCRIPTION OF THE PREFERRED EMBODIMENT

Figure 1:
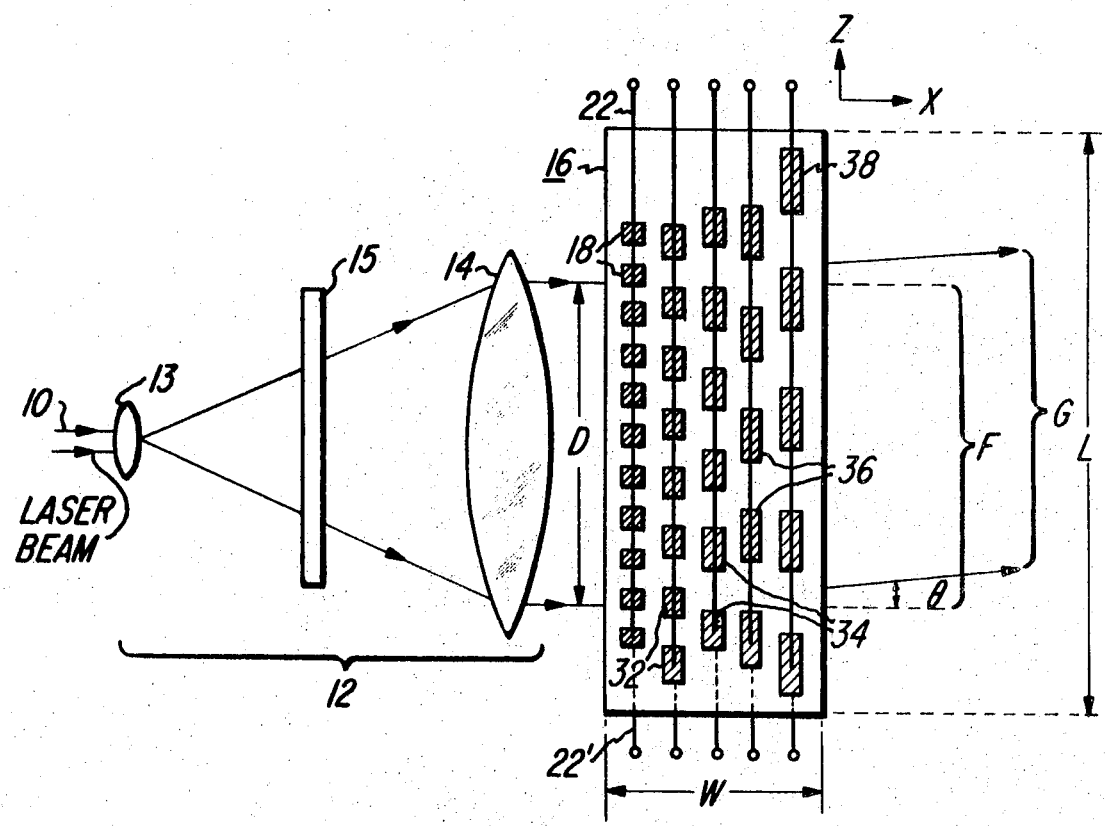
FIG. 1 is a plan view of a digital light deflector constructed according to the teachings of the invention.
Figure 2:
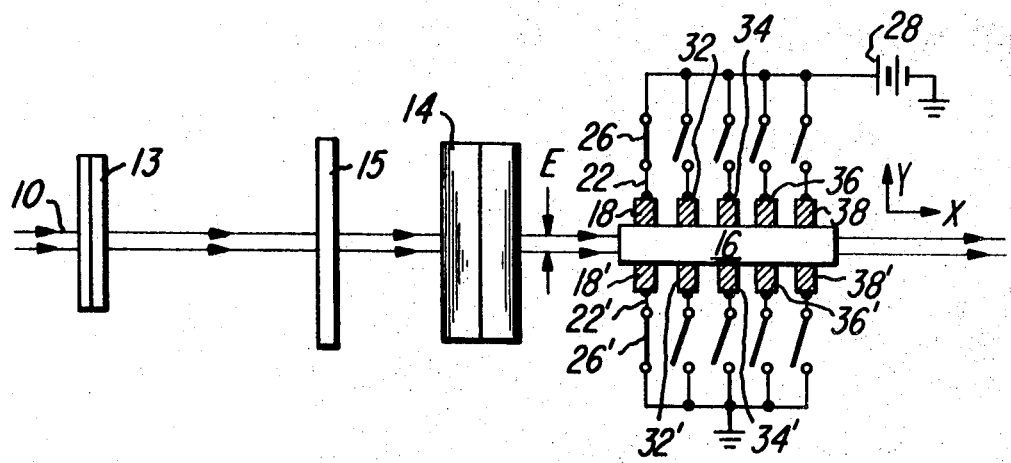
FIG. 2 is an elevation of the light deflector shown in FIG. 1.
Figure 3:
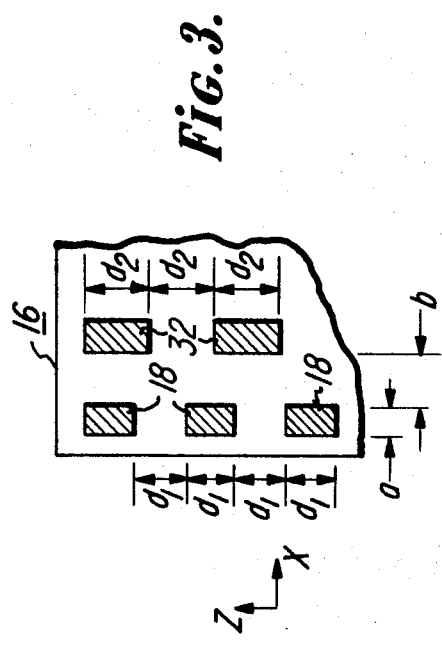
FIG. 3 is a fragmentary detailed view of a portion of FIG. 1.

Reference is now made to FIGS. 1, 2 and 3 where there is shown a laser beam 10, which is directed to an optical system 12 for translating the laser into a sheet of light having a large dimension D and a relatively very small dimension E in the other direction. The optical system 12 is illustrated as including cylindrical lenses 13 and 14, but other optical systems employing spherical lenses or thin film optical waveguide couplers may be used. The optical system 12 includes a polarizer 15 so the sheet of light leaving the lens 14 consists of parallel or collimated rays of light which are polarized in the direction Y shown in FIG. 2. The polarized sheet of light having dimensions D and E is directed to the edge of a slab 16 of electro-optic crystal material. The crystal material may be lithium niobate, $LiNbO_3$, for example. Another suitable crystal material is strontium barium niobate, $Sr_{(0.75)}Ba_{(0.25)}Nb_2O_6$. The slab 16 is lithium niobate electro-optic crystal is oriented so that an electric field impressed across the crystal in the direction of the Y axis of the crystal (in the thickness direction T) will act to change the index of refraction of light passing through the crystal in the X direction (the direction of the width dimension W), if the incident light is polarized and has its E field parallel with the impressed electric field (perpendicular to the major surfaces of the crystal slab).

An electric field or fields are impressed on the crystal 16 by means of a plurality of electrodes positioned on at least one major surface of the crystal slab. A first column of electrodes 18 is positioned on the top surface of the crystal and arranged as a column of equally dimensioned and equally spaced electrodes. A matching column of registered electrodes 18' are positioned on the bottom surface of the crystal slab. All of the electrodes 18 are connected together by a bus 22, and all of the matching electrodes 18' on the bottom of the crystal are connected by a bus 22'. The bus 22 is connected through a switch 26 to one terminal of a source 28 of electric potential and bus 22' is connected through a switch 26' to the other terminal of source 28. The source 28 may be one providing a potential of about 1,500 volts. The described elements permit the connection of an electric potential across the electrodes 18 on the top of the crystal and the electrodes 20 on the bottom of the crystal so that an electric field diffraction grating is established in the crystal slab.

The dimensions and deflection characteristics of the electric field deflection grating within the crystal are determined by the dimensions and spacings of the electrodes 18 and 18', which are constructed using well-known photographic techniques and etching procedures. The electrodes 18 and 18' are shown in FIG. 3 to have a dimension $d_1$ in the direction of the column, a spacing also equal to $d_1$, and a dimension $a$ in the other direction, which is about half of the dimension $d_1$. The angle of deflection imparted to a sheet of light passing through the crystal, represented by the angle $\theta$ in FIG. 1, is related to the dimension and spacing of the electrodes 18 by the formula:

$$\sin \theta_1 = (\lambda)/2d_1)$$

where $\lambda$ is the wavelength of the light. The electrodes of a column need not be equally dimensioned and spaced but may be dimensioned and spaced according to some other periodic array such as one in which the $a$ dimension varies in the $z$ direction according to the formula:

$$\sin \pi Z/d_n$$

In this case the index of refraction in the crystal will have a sinusoidal variation in the $Z$ direction and will tend to give a large percentage of first order grating spectra.

The column of electrodes is shown as being at right angles with the direction of the incident beam. The column of electrodes may be at other transverse angles with the beam, and may, for example, be at the Bragg angle. In this case, if the dimension $a$ of the electrodes is also greatly extended, higher order diffraction components are absent and substantially all of the light of the incident beam can be deflected.

The electric field grating produced in the lithium niobate crystal by the electrodes acts as a phase grating on an incident light beam polarized in the direction of the Y axis shown in FIG. 2. According to another mode of operation, the electric field grating acts as a polarization grating when the incident light is polarized in a direction approximately 45° from the direction of the Y axis. When different crystal materials are used, the orientations of the crystal axes in relation to the polarization of the incident light and the direction of the electric field should be chosen following well-known criteria to provide a phase grating or a polarization grating, as may be desired.

It is thus far apparent that, in the absence of the application of an electric potential to the columns of electrodes 18 and 18', the incident sheet D of light passes directly through the crystal to output position F, but that when an electric potential is applied to the electrodes, the output sheet of light is deflected an amount represented by the angle $\theta$ to output position G.

The crystal slab 16 is also provided with a second column of registered electrodes 32 and 32' which have a larger dimension $d_2$ and an equally larger spacing also equal to $d_2$. The more coarsely dimensioned electrodes 32 and 32' of the second column produce a coarser electric field diffraction grating in the crystal than the electrodes 18, 18' of the first column, and therefore the electrodes of the second column produce a smaller amount of deflection when energized than the electrodes of the first column. The slab 16 is also provided with additional third, fourth and fifth columns of electrodes 34, 34', and 36, 36' and 38, 38', having progressively larger dimensions to provide progressively smaller amounts of deflection of the light passing through the crystal. The crystal slab 16 is thus shown to be provided with five sets or columns of electrodes any one of which may be energized from the source 28 through switches to provide respective different amounts of deflection of a sheet of light passing through the crystal.

An additional number of different discrete angles of deflection can be achieved by energizing more than one of the columns of electrodes at a time. The energization of every different combination of columns of electrodes results in a corresponding different output angle of deflection from the crystal. The number of different directions in which the output light can be deflected is equal to $2^n$ where $n$ is the number of columns of electrodes on the crystal. For example, when there are five columns of electrodes as shown in the drawing, and all combinations of columns can be energized, the light can be deflected to 32 different directions. Therefore, a large number of different deflection angles can be obtained with relatively few columns of electrodes.

According to a simpler, but less efficient construction, the bottom electrodes 18', 32', 34', 36' and 38' are replaced by a continuous conductive electrode which extends over the bottom surface of the crystal and is permanently connected to ground.

The deflection system shown in FIGS. 1 and 2 produces an output sheet of light having one of many desired deflection angles in a direction lying in the plane of the sheet of light. Since it is frequently desired to produce a deflected output light in the form of a beam of light, the system shown in FIGS. 1 and 2 can normally be followed by conventional optics (not shown) which is constructed to translate the deflected sheet of light to a deflected beam of light. For this purpose, a beam compressor may be employed which is the inverted equivalent of the beam expander 13, 14 acting on the incident light beam 10.

Figure 4:
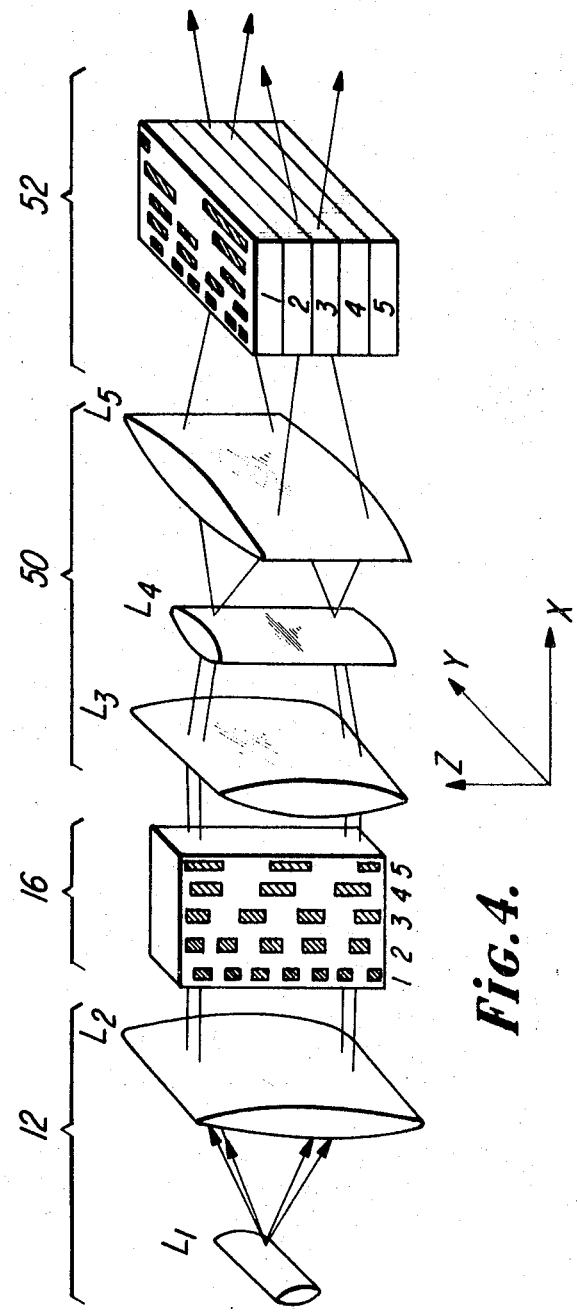
FIG. 4 is a perspective view of a deflection system, including the deflector of FIG. 1, to provide deflection in both X and Y directions.

Reference is now made to FIG. 4 for a description of an optical deflector according to the invention which is capable of deflecting a beam of light by any one of many discrete amounts in one direction, and then deflecting the resulting light by any one of many discrete amounts in an orthogonal direction. The optical system 12 and the crystal slab 16 are the same as the corresponding elements shown in FIGS. 1 and 2. The light output from the crystal 16 is passed through an optical system 50 which translates the vertically oriented sheet of light from the crystal 16 to a correspondingly deflected horizontal sheet of light for application to a stack 52 of deflectors each of which is like the deflector 16. There are as many deflectors in the stack 52 as there are output deflection angles from the stack 16. That is, five different columns of electrodes shown on the deflector 16 provide five different angles of deflection therefrom. The stack 52 of deflectors includes five separate deflectors each like deflector 16.

When the first column of electrodes is employed to produce a given deflection from deflector 16, the deflected light is made to go through the first deflector in the stack 52. Similarly, when the second column of electrodes and deflector 16 is energized to produce a different angle of deflection, the deflected light goes through the second deflector in the stack 52. In like manner, the third, fourth and fifth columns of electrodes in deflector 16 result in deflected light going through the third, fourth and fifth deflectors in the stack 52. A column of electrodes in any particular one of five deflectors in stack 52 can be energized to produce an additional deflection of the light in a direction orthogonal to the direction of deflection produced by deflector 16. Since it is known when a particular one of the columns of electrodes in deflector 16 will be energized, solely a desired one of the columns of electrodes in solely one of the deflectors in the stack 52 needs to be energized.

Therefore, the power consumption required to achieve the deflection in two directions is only twice the amount needed for deflection in a single direction.

What is claimed is:

1. An optical deflector or modulator, comprising a slab of electro-optical material having major opposite surfaces,
   a periodic array of spaced electrodes arranged in a column on a first major surface of said slab,
   electrode means on the other opposite major surface of said slab,
   means to direct an incident sheet of light having a given polarization through said slab between said column of spaced electrodes, and
   means to establish an electric potential difference between the electrodes on the first surface of said slab and the electrodes on the opposite surface of said slab, whereby an electric field diffraction grating is established in said slab which causes the sheet of light emerging from said slab to be deflected a given amount.

2. A deflector as defined in claim 1 wherein said incident sheet of light is directed through said slab in a direction transverse to said column of electrodes.

3. A deflector as defined in claim 1 wherein said electro-optic crystal material is lithium niobate, and said incident sheet of light is polarized in the direction perpendicular to said major surfaces of the crystal slab.

4. A deflector as defined in claim 1 wherein the electrodes in said array of electrodes are equally dimensioned and equally spaced.

5. A deflector as defined in claim 1 wherein said electrode means on the opposite major surface of the slab consists of matched electrodes located in registry with the electrodes on said first major surface.

6. A deflector as defined in claim 1, and, a plurality of addictional columns of electrodes each having progressively different dimensions and spacings, whereby additional different amounts of deflection can be imparted to the sheet of light.

7. A deflector as defined in claim 6 wherein said electrode means on the opposite major surface of the slab consists of matched electrodes located in registry with the electrodes on said first major surface.

8. A deflector as defined in claim 6, wherein said means to establish an electric field potential difference between the electrodes on the two surfaces of the slab includes switch means to energize any combination of said column of electrodes, whereby to produce as many different angles of deflection as there are combinations of column.

9. A deflector as defined in claim 8 wherein the electrodes in each given column are equally dimensioned and equally spaced.

10. A deflector as defined in claim 7, and, in addition, a stack of deflectors each as defined in claim 7, the deflectors of said stack being located to receive output light from said deflector and being arranged with major surfaces at right angles to the major surfaces of said deflector, and optical means to rotate the sheet of light from said deflector 90° so that it enters the input edges of deflectors of said stack, whereby to provide deflection of light in two dimensions.

* * * * *